United States Patent Office 3,307,908
Patented Mar. 7, 1967

---

3,307,908
PREPARATION OF ALUMINUM NITRIDE
Victor Mandorf, Jr., Olmsted Falls, Ohio, assignor to Union Carbide Corporation, a corporation of New York
No Drawing. Continuation of application Ser. No. 255,650, Feb. 1, 1963. This application Aug. 16, 1965, Ser. No. 480,091
9 Claims. (Cl. 23—192)

This application is a continuation application of copending application Serial No. 255,650, now abandoned, entitled "Preparation of Aluminum Nitride," filed February 1, 1963, which is a continuation-in-part application of application Serial No. 822,425, now abandoned, filed June 24, 1959.

The invention relates to a process for preparing aluminum nitride.

The simplest method for preparing aluminum nitride, at least theoretically, is to heat aluminum metal in the presence of nitrogen; however, this method is more difficult than it first appears. Since aluminum melts at about 660° C. and the reaction of aluminum and nitrogen begins in general at about 800° C., the aluminum will melt and coalesce into a pool before the reaction begins, and this prevents an intimate contact of the reactants. Thus, very low yields are obtained, and the purity of the product aluminum nitride is low because of the large quantities of unreacted aluminum present.

Another method known in the art for preparing aluminum nitride entails arcing aluminum electrodes in a nitrogen atmosphere. This method produces a material of high purity, but it has not found wide acceptance because of its very low efficiency in terms of production rates.

Other known preparative methods for aluminum nitride are generally unsatisfactory especially on a commercial scale because they either yield a product of low purity or have low efficiencies.

Accordingly, the main object of the invention is to provide a process for preparing aluminum nitride, which process is capable of a high rate of yield and an extremely pure product.

Briefly, the above object is attained by a process which comprises mixing finely divided aluminum metal with a carrier material, and then nitriding the aluminum in the mixture at a temperature above about 800° C. by providing a nitriding atmosphere free from oxygen around the mixture and then heating the mixture. The carrier material prevents coalescence of the aluminum metal and thus allows the nitriding atmosphere to impinge upon a large surface area of aluminum. A rapid and complete reaction results.

The nitriding atmosphere should be inert to aluminum nitride and can be composed of any materials as long as it contains nitrogen available for the nitriding reaction but does not contain materials, such as oxygen, water, cyanogen, hydrogen sulfide, and carbon dioxide, which interfere with the nitriding reaction or the nitrided product to form undesirable impurities such as oxides, carbides, and sulfides. Nitrogen, ammonia, and mixtures thereof are preferred; however, relatively small amounts of hydrogen and/or carbon monoxide may be present in the nitriding atmosphere without undesirable effects. Pure nitrogen is preferred for the production of an extremely pure product.

The carrier material employed in accordance with the present invention is selected from the group consisting of aluminum nitride, aluminum fluoride, and mixtures thereof. The carrier material should obviously be substantially pure to minimize the introduction of unnecessary impurities into the reaction mixture, and the amount of the carrier material present in the total mixture of it and particulate aluminum must be at least about 30 percent by weight with the remaining portion aluminum, i.e., up to about 70 percent. At higher concentrations of aluminum, the aluminum tends to coalesce, thereby affecting the reaction deleteriously. The preferred reaction mixture consists of from about 30 to about 60 percent by weight aluminum and from about 70 to about 40 percent by weight carrier material. With higher concentrations of carrier materials, even up to 99 and higher percent, a product of high purity can be produced, but the total amount of product prepared per batch will obviously be lower. If aluminum fluoride is used as, or as part of, the carrier material, it can be easily removed from the product by heating the mixture of product and carrier material to at least about 1300° C., the sublimation temperature of aluminum fluoride. If any aluminum nitride is present as carrier material, there is of course no need to separate it from the product aluminum nitride. Thus, a product of high purity can be obtained since the carrier material permits a substantially complete and rapid reaction and since aluminum fluoride can be easily removed from the reaction mixture when necessary or desirable.

The fact that aluminum fluoride sublimes rather than melts is a great advantage, and a strong recommendation for its use as a carrier material. In addition to this characteristic, aluminum fluoride has a fairly high vapor pressure at the reaction temperature of aluminum and nitrogen. Thus, as the exothermic reaction proceeds, the reaction is helped by the increased porosity and surface area caused by partial vaporization of the aluminum fluoride. Furthermore, the vaporization of the aluminum fluoride removes energy from the reaction mixture and thus helps to control the exothermic reaction.

The reaction of aluminum and nitrogen begins at a reactant temperature of about 800° C. and proceeds as follows:

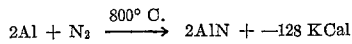

$$2Al + N_2 \xrightarrow{800° C.} 2AlN + -128 \text{ KCal}$$

The highly exothermic nature of the reaction can be controlled by regulating the nitrogen flow into the reaction mass, and can be used as a guide to indicate the completion of the reaction. At about 800° C., the reaction will supply enough heat to maintain the temperature necessary for reaction; therefore, an external source of heat is usually unnecessary after the reaction mixture reaches about 800° C. At the completion of the reaction, the temperature will drop, thereby indicating the reaction is complete. The reaction is preferably conducted at temperatures between about 800° C. and about 1300° C. to prevent the possibility of an uncontrolled reaction which may lead to excessive sublimation of aluminum nitride, coalescence of aluminum, and a resulting decrease in the reaction efficiency. At higher temperatures, the reaction tends to become uncontrollable, although a reaction at these temperatures is feasible. Reaction temperatures between about 800° C. and about 1100° C. have proved to be the most satisfactory for obtaining a product of excellent quality.

In the practice of the invention, aluminum powders having average particle sizes of 20, 30, and 120 microns have been successfully employed. These particle sizes have no effect on the completion of the reaction, since in no case was there free aluminum in the reaction product, but an aluminum powder having an average particle size of 120 microns gave a better yield and a product of higher purity than an aluminum powder of about 20 to 30 microns. This was probably the result of the powder of 120 microns having a lower percentage of combined oxygen because of a smaller surface area when compared to the finer aluminum powders. Thus, an aluminum powder of about 120 microns is preferred. This in no way limits the invention, however, since particles of almost any size will be operative as long as they can be considered as a powder, although the quality of the product may vary somewhat.

The particle size of the carrier material must be fine enough to prevent the aluminum powder from coalescing into molten pools at the reaction temperature. A particle size of about 40 microns has been successfully employed, and is prefered since a fine powder of the carrier material separates the aluminum powder more efficiently than larger powders and thus retards coalescence of aluminum better. The preferred fine particle sizes of the carrier material are not considered as limiting the invention, however, since any particle size considered as a powder will be operative although the quality of product may vary.

nitride and as free as possible of oxygen and other materials which generally interfere with nitriding and the formation of aluminum nitride.

Although the carrier material may consist of aluminum fluoride, aluminum nitride, or mixtures thereof, there are certain advantages gained by using either one, the other, or mixtures of the two. The presence of aluminum nitride in the carrier material results in a soft reaction product, and this effect varies with the amount of aluminum nitride in the carrier material. With aluminum fluoride alone as the carrier material, the reaction product is a hard sintered cake. This effect is shown in Table I below:

*Table I.—Effect of Carrier Material Composition on Reaction Product*

| Material | Blends | | | |
|---|---|---|---|---|
| | 1 | 2 | 3 | 4 |
| Al (25 to 30 mesh), Wt. Percent | 50 | 50 | 41.5 | 50. |
| AlN (micro milled), Wt. Percent | | 33 | 41.5 | 50. |
| AlF$_3$ (micro milled), Wt. Percent | 50 | 17 | 17 | |
| Reaction Temp., °C | 800–1,100 | 800–1,100 | 800–1,100 | 800–1,100. |
| Atmosphere | Nitrogen | Nitrogen | Nitrogen | Nitrogen. |
| Stabilization Temp., °C | 1,900 | 1,900 | 1,900 | 1,900. |
| Atmosphere | Argon | Argon | Argon | Argon. |
| Remarks | Reaction product is a hard, white sintered cake. Before milling, the material had to be crushed in a jaw crusher. | Same as 1, except that the reaction product crushed more easily. | Reaction product was soft enough to be crushed easily with mortar and pestle. | Reaction product was very soft and punky: however, it was not white but a light grey—probably carbon pickup from reaction capsule. |

After the reaction is complete, the reaction mixture of aluminum nitride and carrier material is heated to at least about 1300° C. to sublime the aluminum fluoride if it is present in the carrier material and if its removal is desired. Furthermore, the mixture is preferably heated to at least about 1900° C. and maintained at this temperature for a time up to several hours to stabilize the product aluminum nitride if this is desirable. Aluminum nitride produced at temperatures below about 1400° C. tends to be subject to rapid hydrolysis by moist air. Various degrees of stability can be effected by varying the time and/or the temperature of this stabilization step. In general, the stabilization temperature is preferably between 1700° C. and 2100° C., and the time is between 5 minutes and 3 hours, depending on the type of product desired. A temperature of about 1900° C. and a time of one hour has proved to be the most satisfactory for a product of good quality. Higher temperatures and longer times improve the product stability only slightly, and can be a disadvantage in that excessive crystal growth in the product is sometimes promoted.

The heating step for stabilization can be conducted in a nitrogenous atmosphere, but it is preferably conducted at least during the latter part, e.g., during temperatures above about 1900° C., in an atmosphere of an inert gas, such as argon, neon, helium, and the like. An inert atmosphere will help to prevent erosion of the furnace walls, and at the same time may permit the removal of any aluminum oxide (Al$_2$O$_3$) contamination present in the product aluminum nitride. The elimination of nitrogen in the atmosphere allows a small amount of aluminum nitride to decompose to maintain equilibrium, thereby providing free aluminum which can react with Al$_2$O$_3$ contamination to form a volatile oxide. The reactions are illustrated below:

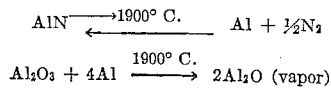

$$Al_2O_3 + 4Al \xrightarrow{1900° C.} 2Al_2O \text{ (vapor)}$$

In the practice of the invention, the inert gas is preferably introduced around the mixture when the temperature reaches about 1500° C. during the heating step. In any event, the atmosphere during the reaction and during the subsequent heating step should be inert to aluminum In general, a carrier material consisting of about 15 to about 50 percent by weight aluminum fluoride and about 50 to about 85 percent aluminum nitride is preferred. Such a composition provides the best final product for most purposes. A carrier material consisting of by weight about 75 percent aluminum nitride and about 25 percent aluminum fluoride is preferred for production of a generally usable product on a commercial scale. A reactant mixture consisting of by weight about 43 percent aluminum and about 57 percent of this particular composition of the carrier material is generally preferred for commercial production. This reactant mixture consists of about 43 percent aluminum, about 43 percent aluminum nitride, and about 14 percent aluminum fluoride.

The following example illustrates the invention more specifically:

EXAMPLE I 1800 grams of aluminum powder having an average particle size of 120 microns, 1800 grams of aluminum nitride powder of about 40 microns, and 600 grams of aluminum trifluoride powder of about 40 microns were blended with nails in a tumbling barrel. The blend was placed in a graphite reaction vessel having a perforated bottom and fitted with an inlet tube to permit the introduction of nitrogen into the vessel through the perforated bottom and then through the blend. The reaction vessel was placed in a resistance heated graphite tube furnace having a nitrogen atmosphere therein.

Nitrogen was fed into the reaction vessel through the inlet tube at a rate of about 10 cubic feet per hour, and the furnace was rushed to a temperature of 825° C. to 850° C. at which the reaction was self-sustaining. The reaction rate was regulated to maintain a temperature below 1100° C. by adjusting the amount of nitrogen introduced into the reaction vessel. The reaction temperature dropped below 825° C. as the reaction reached completion.

The furnace temperature was then raised slowly to 1900° C. and held there for one hour to stabilize the aluminum nitride. When the temperature reached 1500° C. during this heating step, the nitrogen atmosphere was replaced with an argon atmosphere by feeding argon at a rate of 1 cubic foot per hour into the reaction vessel.

The furnace was then allowed to cool under the argon atmosphere, and the product was removed.

The product yield was 98.5 percent of the theoretical amount, and the purity of the material was 97 percent based on the amount of nitrogen present. Chemical analysis showed by weight 65.6 percent aluminum, 33.0 percent nitrogen, and 0.19 percent carbon. The particle size distribution of the product is shown in Table II below:

*Table II.—Particle size distribution of aluminum nitride product*

| Diameter in microns: | Percent of product by weight having a smaller diameter |
|---|---|
| 84 | 100 |
| 36 | 90 |
| 17.5 | 80 |
| 12.0 | 70 |
| 9.7 | 60 |
| 8.4 | 50 |
| 7.2 | 40 |
| 6.1 | 30 |
| 5.0 | 20 |
| 3.8 | 10 |
| 3.0 | 5 |
| 1.8 | 0 |

It will be appreciated by those in the art that the process of the invention is a single step process in that the reactant mixture charged into the furnace is removed as the desired pure final product.

What is claimed is:

1. A process for preparing aluminum nitride, which process comprises forming a mixture consisting of finely divided aluminum in an amount of from about 30 to about 60 percent by weight and from about 70 to about 40 percent by weight finely divided carrier material selected from the group consisting of aluminum nitride, aluminum fluoride, and mixtures thereof, providing around said mixture a nitriding atmosphere inert to aluminum nitride and free from oxygen and other materials which interfere with nitriding, said nitriding atmosphere consisting of at least one member selected from the group consisting of nitrogen and ammonia and heating the mixture to at least about 800° C. while under said atmosphere, thereby nitriding said aluminum in said mixture to form aluminum nitride.

2. The process defined in claim 1, wherein said nitriding atmosphere is nitrogen.

3. The process defined in claim 2 wherein said carrier material consists of from about 15 to about 50 percent by weight aluminum fluoride and from about 50 to about 85 percent by weight aluminum nitride.

4. The process defined in claim 1 wherein said mixture consists of by weight about 43 percent aluminum, about 43 percent aluminum nitride, and about 14 percent aluminum fluoride.

5. A process for preparing aluminum nitride, which process comprises forming a mixture consisting of finely divided aluminum in an amount of from about 30 to about 60 percent by weight and from about 70 to about 40 percent by weight finely divided carrier material selected from the group consisting of aluminum nitride, aluminum fluoride, and mixtures thereof, providing around said mixture a nitriding atmosphere inert to aluminum nitride and free from oxygen and other materials which interfere with nitriding, said nitriding atmosphere consisting of at least one member selected from the group consisting of nitrogen and ammonia heating said mixture to a temperature between about 800° C. and about 1300° C. while under said atmosphere, thereby nitriding said aluminum in said mixture to form aluminum nitride, and finally heating said mixture to a temperature of at least about 1700° C. under an atmosphere inert to aluminum nitride and free from oxygen and other materials which interfere with nitriding, thereby subliming any aluminum fluoride present and stabilizing the reaction product.

6. The process defined in claim 5 wherein said nitriding atmosphere is nitrogen.

7. The process defined in claim 5 wherein said carrier material consists of from about 15 to about 50 percent by weight aluminum fluoride and from about 50 to about 85 percent by weight aluminum nitride.

8. The process defined in claim 5 wherein said mixture consists of by weight about 43 percent aluminum, about 43 percent aluminum nitride, and about 14 percent aluminum fluoride.

9. A process for preparing aluminum nitride, which process comprises forming a mixture consisting of finely divided aluminum in an amount of from about 30 to about 60 percent by weight and from about 70 to about 40 percent by weight finely divided carrier material selected from the group consisting of aluminum nitride, aluminum fluoride, and mixtures thereof, providing around said mixture a nitrogen atmosphere, heating said mixture to a temperature between about 800° C. and about 1300° C. while under said atmosphere, thereby nitriding the aluminum in said mixture to form aluminum nitride, and then heating said mixture to a temperature between about 1900° C. and about 2100° C. under an atmosphere of an inert gas at least during temperatures above 1900° C., thereby subliming any aluminum fluoride present and stabilizing the reaction product.

References Cited by the Examiner

UNITED STATES PATENTS

| 741,396 | 10/1903 | De Chalmot | 23—191 X |
| 1,198,965 | 9/1916 | Serpek | 23—192 |
| 1,233,926 | 7/1917 | Serpek | 23—192 |
| 1,803,720 | 5/1931 | Miner | 23—192 |
| 2,835,566 | 5/1958 | Perieres et al. | 23—192 X |
| 2,929,126 | 3/1960 | Bollack et al. | 23—192 |

OTHER REFERENCES

Long et al.: "Aluminum Nitride, A Refractory for Aluminum to 2000° C.," J. American Ceramic Society, vol. 42, No. 2, pp. 53–59, 1959.

Mellor: Comprehensive Treatise on Inorganic and Theoretical Chemistry, Longmans, Green & Co., N.Y. 1928, vol. VIII, pp. 111–114.

OSCAR R. VERTIZ, *Primary Examiner.*

J. J. BROWN, *Assistant Examiner.*